Aug. 19, 1941.  J. C. CHENETTE  2,252,835

SHAKER FOR GRANULAR MATERIAL

Filed Jan. 24, 1940

INVENTOR.
Joseph C. Chenette
BY John F. Stark
ATTORNEY.

Patented Aug. 19, 1941

2,252,835

UNITED STATES PATENT OFFICE 2,252,835

SHAKER FOR GRANULAR MATERIAL

Joseph C. Chenette, Flat Rock, Mich.

Application January 24, 1940, Serial No. 315,315

3 Claims. (Cl. 65—45)

This invention relates to condiment dispensers in general and more particularly relates to a shaker for salt, and like granular material possessing hygroscopic characteristics, in which it is desirable to preserve the granular contents free from moisture absorption and in free pouring condition.

Among the objects of the present invention is the provision of a shaker means which includes a combination end closure and dispenser cover arranged to form the base of the shaker; the provision of a shaker as above described in which the dispenser cover is releasably secured to the lower end of the shaker body and the outlet therefrom is baffled by an overlying domed or flanged cup secured thereto; the provision of a shaker of the indicated character that protects the contents thereof from dust, moisture and insects, which has dispenser openings in a composite base portion consisting of associated spaced members, one having a relatively large axial aperture and the other a plurality of comparatively smaller openings concentric thereto.

Another object of the present invention is the provision of a shaker for granular contents and arranged to be used by reciprocating the shaker without inverting the same, including a base portion having a central discharge outlet baffled by an overlying cup shaped deflector including a series of longitudinal openings therein secured thereto in spaced relation for a portion of its marginal edges, and defining a channeled passage therebetween for reversing the direction of flow of the contents before discharge from said shaker.

Other objects of the invention include the provision of a hollow shaker body having composite base members secured together in spaced relation, defining a plurality of channeled passages therebetween including a plurality of through openings from the interior of the shaker into said channeled passages and a substantially upwardly directed exit from said passages to a downwardly directed outlet to the atmosphere; the provision of a shaker as above described so constructed and arranged as to be effective only by positively longitudinally reciprocating the shaker without inverting the same, and which has means to prevent accidental discharge of the contents thereof by merely oscillating the shaker about an axis inclined to the vertical; the provision of a shaker as above described comprising a container body and a composite closure and dispenser member for the lower end thereof including an outer member having an upstanding centrally disposed section with a discharge outlet therein retaining in position an inner dispenser member having a series of longitudinally extending openings concentrically surrounding the wall of said discharge outlet and in conjunction therewith defining a longitudinal channeled passage upwardly and downwardly out of said shaker.

Further and other objects of the invention reside in the novel combination and arrangement of parts as will hereinafter become apparent when considered in conjunction with the accompanying drawing forming a part of this specification and specifically pointed out in the appended claims.

In describing the invention in detail reference will be had to the accompanying drawing, wherein like reference characters denote like or corresponding parts throughout the several views, and in which.

Figure 1:
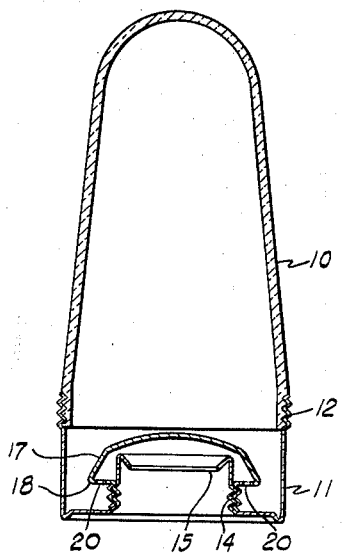
Fig. 1 is a central vertical sectional view of one shaker embodying the features of this invention.
Figure 2:
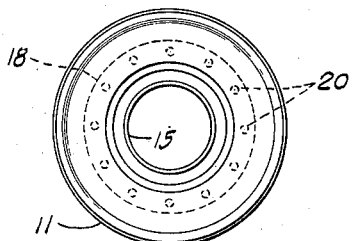
Fig. 2 is a bottom plan view thereof.

Referring now more particularly to Figs. 1 and 2, it will be apparent that a preferred form of the shaker includes a reservoir or container 10 for the storage of granular condiment material, such as salt, sugar, and the like. The body of the container 10 may be composed of any suitable material such as an opaque plastic, but is preferably formed of glass so that the contents thereof will be visible. The upper end of the container is closed and its lower end open. A base 11 of metal, plastic, rubber, or any other suitable material is applied to the externally threaded lower end of the container by a complementary internally threaded upper marginal portion 12 of the base. The central portion of the base is upturned in an axial direction, having a portion of its upstanding wall externally threaded as at 14, and the inner marginal edge of the base terminates in a reverse bent flange which forms an annular discharge outlet 15. A hollow dome shaped part 17 has a complementary, internally threaded, lower marginal portion for engagement with the threads 14, of the base 11, to fix the parts in adjusted position, whereby the upper portion of the dome of the part 17 overlies or baffles the discharge outlet 15. A laterally outwardly disposed shoulder 18, of the dome part 17 concentrically surrounds the discharge outlet 15 below the plane thereof and in spaced relation thereto to provide an annular longitudinally extending passage which is in communication with the material of the container through a plurality of holes 20 in the lateral shoulder 18 and also in communication with the discharge outlet.

From the foregoing it will be apparent that the desired amount of contents of the container may be discharged through the opening 15, depending upon the rapidity of the up and down shaking motion imparted to the shaker. By imparting shaking motion to the shaker, the contents will be forced upwards through the holes 20 into the annular passage or trough surrounding the discharge opening and be given sufficient acceleration to just pass over the lip thereof, or, at the will of the user, be given sufficient upward momentum to sharply strike the lower concave surface of the dome part and be dispersed more generously over a wider area. It is to be observed that the central upstanding wall of the base 11, in which is formed the rimmed discharge opening 15, constitutes means, in conjunction with the circumscribed dome shaped part 17, to prevent unintentional discharge of portions of the contents in consequence of the shaker being accidentally upset, inverted out of curiosity, or idly oscillated back and forth in pendulum fashion, and it is only by a positive up and down shaking motion, sufficient to overcome the inertia of the material, being imparted to the shaker that any appreciable contents may be discharged. Moreover the contact face of the base 11 being in a plane below the discharge opening 15, on which the shaker rests when placed on a table, counter or other suitable support, effectively prevents any dust, insects, or moisture from entering the interior of the container 10 to contaminate or compact the contents thereof. Likewise, due to the arrangement of the parts, the size of the holes 20 may be made larger than usual so that there is no danger of the shaker becoming clogged and it can be used with either coarse or fine material, such as sugar, salt or pepper, without fear of the material flowing too freely from the shaker, as the discharge of the contents depends wholly on the amount of shaking.

Figure 3:
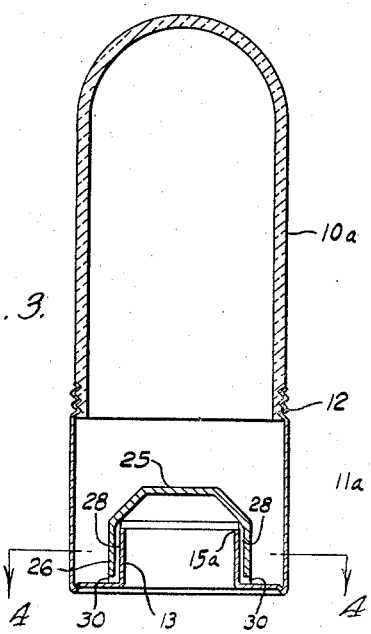
Fig. 3 is a central vertical section of a further form of the invention.
Figure 4:
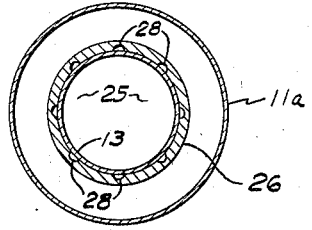
Fig. 4 is a sectional plan view taken substantially on the line 4—4 of Fig. 3.
Figure 5:
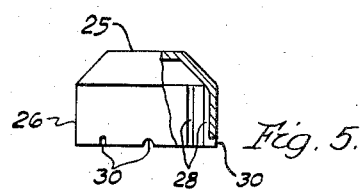
Fig. 5 is an elevational view of the metering element, of the shaker shown in Fig. 3, with a wall thereof broken away to reveal the interior section.

Now having further reference to Figs. 3, 4 and 5, there is shown a shaker which functions similar to that just described, and like reference characters denote like elements while those with subscripts denote corresponding parts. Accordingly, it will only be necessary to describe the modified parts to provide a complete understanding of this form of the invention. In this instance the cylindrical container 10a has a closed upper end and to the threaded open lower end thereof the base 11a is secured by a complementary threaded section 12. The base 11a has an inwardly and upwardly turned wall 13 terminating in an annular discharge outlet 15a, as distinguished from the reverse bend in the wall rimming the discharge outlet 15. A hollow cup-shaped member 25, with a closed upper end and a depending annular wall 26 frictionally positioned over the upstanding wall 13 of the base 11a, provides the metering part of the container. Around the inner peripheral face of the wall 26 a plurality of longitudinally disposed and arcuately spaced grooves 28 are formed therein extending from the lower marginal edge of the member 25 to the upper closed end. A like number of openings 30 extending radially outward from each of the grooves 28 through the peripheral wall 26, of the cup member 25, provide communication from the lower interior portion of the base 11a through the grooves 28 to the discharge outlet 15a. It will be apparent the grooves 28, in conjunction with the adjacent outer surface of the base wall 13, define a series of longitudinal passages concentrically surrounding the discharge outlet 15 and in communication therewith. This shaker has been fashioned expressly for manufacture in plastic molds each of the several component parts of which are adapted to be cored and drawn therefrom, although it is not necessarily limited to such construction, as the container body 10a may be of glass or other suitable material and the base parts 11a and 25 of rubber or metal stampings. Obviously, of course, this shaker and the exemplification previously described may be readily disassembled for cleaning or adjustment and replacement of the various parts. The operation and use of the shaker with its attendant advantages will be understood from the description of the previous container.

From the foregoing it will be apparent that portions of the contents of the container may be discharged only by longitudinally reciprocating the shaker, accomplishing, among other things the objects and advantages of the invention first enumerated. However, it is to be understood that it is not the intention to be restricted to the specific embodiments of the invention disclosed but to include all modifications and formal changes the invention may assume in practice that come within the scope of the following claims.

What I claim is:

1. A shaker for granular material including a container open at the lower end, a removable base on the open end provided with a discharge opening surrounded by an upstanding wall having a threaded section thereon adjacent its lower end, a hollow metering part threaded to and held in position by the upstanding wall of said base and having a substantially dome shaped upper end overlying in spaced relation the plane of said discharge opening, a plurality of longitudinally extending chambers concentrically surrounding the discharge opening defined by the base and said metering part in communication at the upper end with said discharge opening, openings in said metering part below said discharge opening in communication with the material in the container and said chamber so that material may flow from the container into the chamber between said parts to be deflected out of said discharge opening by the under-surface of said dome portion, when an up and down shaking motion is imparted to the shaker.

2. A shaker for granular material including a container open at the lower end, a removable base on the open end provided with a discharge opening surrounded by an upstanding wall having a threaded section adjacent its lower end, a hollow metering part threaded to said upstanding base wall including a laterally extending flange above said threaded sections and below the plane of said discharge opening, the upper end of said metering part being substantially dome shape and in conjunction with said flanged portion defining an annular chamber concentric to and in communication at its upper end with said discharge opening, openings in the lateral flange of said metering part in communication with the interior of the container and said annular chamber so that material may pass upwardly through said openings into said chamber to be deflected by the under-surface of said dome portion out of said discharge opening when an up and down shaking motion is imparted to the shaker.

3. A shaker for granular material including a container open at the lower end, a removable base on the open end provided with a discharge opening surrounded by an upstanding wall having a threaded section adjacent its lower end and a flange on its upper marginal edge rimming said discharge opening, a hollow metering part threaded to said upstanding base wall including a laterally extending flange above said threaded section and below the plane of said discharge opening, the upper end of said metering part being substantially dome shape and in conjunction with said flanged portion defining an annular chamber concentric to and in communication at its upper end with said discharge opening, openings in the lateral flange of said metering part in communication with the interior of the container so that material may pass upwardly through said openings into said chamber to be deflected by the under-surface of said dome portion downwardly and radially out of said discharge opening when an up and down shaking motion is imparted to the shaker.

JOSEPH C. CHENETTE.